United States Patent [19]

Bayliss

[11] Patent Number: 4,567,966
[45] Date of Patent: Feb. 4, 1986

[54] ACTUATOR ASSEMBLIES FOR VEHICLE BRAKES

[75] Inventor: John P. Bayliss, Worcestershire, England

[73] Assignee: Lucas Industries Public Limited Company, Birmingham, England

[21] Appl. No.: 648,008

[22] Filed: Sep. 6, 1984

[30] Foreign Application Priority Data

Sep. 17, 1983 [GB] United Kingdom ............... 8324942

[51] Int. Cl.$^4$ ............................................. F16D 55/02
[52] U.S. Cl. ................................... 188/71.9; 188/198; 188/196 M
[58] Field of Search ................................ 188/198–203, 188/196 F, 196 C, 196 M, 196 B, 196 BA, 196 D, 196 V, 343, 71.9, 71.8, 79.5, 361–370; 192/111 A

[56] References Cited

U.S. PATENT DOCUMENTS

4,321,986 3/1982 Thistleton ..................... 188/196 F
4,416,356 11/1983 Osborne ........................ 188/343 X Primary Examiner—Douglas C. Butler
Attorney, Agent, or Firm—Laff, Whitesel, Conte & Saret

[57] ABSTRACT

An actuator assembly incorporates a strut assembly of which the effective length is adjustable to compensate for wear of a friction lining and through which a brake-applying force is transmitted to a braking member, and an adjuster mechanism arranged in parallel with the strut assembly. The adjuster mechanism is arranged in parallel with the strut assembly and incorporates a spring in which energy is adapted to be stored. The mechanism is adapted to receive a signal dependent upon movement of the strut assembly in a brake-applying direction, and is also adapted to apply an adjusting force to the strut assembly in response to energy released from the spring when the brake is itself released.

10 Claims, 10 Drawing Figures

ACTUATOR ASSEMBLIES FOR VEHICLE BRAKES

This invention relates to actuator assemblies for vehicle brakes of the kind in which a brake applying-force from brake-applying means is applied to a braking member through a strut assembly which is guided for axial sliding movement in a longitudinal bore in a housing, and of which the effective length is adjustable, and adjuster means are incorporated for increasing the effective length of the assembly to compensate for wear of friction linings and maintain braking clearances within predetermined limits, the adjuster means incorporating relatively rotatable parts, a spring in which energy is stored in response to relative rotation between said parts when the actuator is operated to apply the brake and after a degree of lost-motion consistent with the desired braking clearances has been taken up, and means for transmitting energy released from the spring to the strut assembly upon release of the brake in order to adjust the effective length of the strut assembly.

In known actuator assemblies of the kind set forth the components of the adjuster means are aligned axially, or co-operate in series, and the operation of the adjuster means depends upon the force in the return springs for the braking members. An axial alignment or co-operation in series requires a housing of substantial axial length to accommodate all the components, and using the force in the return springs to operate the adjuster has the disadvantage that should a high spring force be necessary then high inter-component friction will be present, thereby setting a practical limit to the rate of adjustment attainable from a particular configuration.

According to our invention in an actuator assembly of the kind set forth the adjuster means is arranged in parallel with the strut assembly and incorporates the spring in which energy is adapted to be stored, the adjuster means being adapted to receive a signal dependent upon movement of the strut assembly or the brake-applying means in a brake-applying direction, and the adjuster means being adapted to apply an adjusting force to the strut assembly in response to energy released from the spring when the brake is released.

The signal is applied to the adjuster means through a connection which includes a degree of lost-motion. This may comprise back-lash defined by the point at which a toothed rack meshes with a pinion, which rack is movable with the brake-applying means, or it may comprise a pin- and slot connection between the strut assembly and an intermediate point in the length of a lever, of which one end is pivotally connected to a fixed point in the housing and the other acts on the adjuster means.

The strut assembly comprises inner and outer screw-threaded members, and the outer member meshes with a pinion incorporated in the adjuster means and which is rotatable, when adjustment is required, in order to rotate the outer member relative to the inner, whereby to increase the effective length of the strut assembly.

Some embodiments of our invention are illustrated in the accompanying drawings in which.

The actuator assembly illustrated in FIGS. 1 to 4 of the drawing comprises a strut assembly 1 which is guided to slide in a longitudinal bore 2 in a housing 3 in order to transmit a brake-applying force from a brake actuator 4 to a friction brake member. An adjuster mechanism 5 is located in the housing 3 in a bore disposed in a parallel relationship with respect to the bore 2.

The strut assembly 1 comprises a rotatable internally screw-threaded outer sleeve 7, and a non-rotatable externally screw-threaded inner tappet or thrust member 8 which projects through the outer sleeve 7. The thrust member 8 acts at its outer end on a separate thrust plate 9 of increased diameter for applying a brake-applying force to a brake-operating member, and the opposite end of the thrust member 8 is coupled to a re-set member 33.

A bifurcated wedge 10 having a single inclined face 11 is movable in a direction transverse to the bore 2 in response to operation of the actuator 4, and pairs of rollers 12 and 13 on opposite sides of the strut assembly 1 co-operate between pairs of substantially parallel surfaces, namely an inclined reaction surface 14 on the sleeve 7, and a planar surface 15 on a reaction member 16 through which the strut assembly 1 projects rearwardly. Thus movement of the wedge 10 in a direction to oppose the force in a return spring 17, reacts against the surface 15, and is operative to advance the strut assembly 1 in the bore 2 to apply the brake.

The adjuster mechanism 5 comprises a spindle 20 which is journalled for rotation at opposite ends in counterbores 21 and 22 at opposite ends of the bore in which the mechanism 5 is housed. A first pinion 23 is journalled for rotation on the spindle 20 through a one-way drive 24, and a second pinion 25 has a screw-threaded engagement with a fast-thread on a portion 26 of the spindle 20 which is of increased diameter.

The first pinion 23 is adapted to mesh with a toothed rack formation 27 on the adjacent end face of the wedge 10 when adjustment is required to compensate for wear of the linings of the friction member.

The second pinion 25 permanently meshes with the teeth 18 on the outer face of the sleeve 7, and the teeth are arranged linearly so that the sleeve 7 can move axially without imparting any rotation to the pinion 25. A compression spring 28 acts through a bearing 29 normally to urge the pinion 25 against an end face 30 on the housing 3. The spindle 20 is journalled in the counterbore 22 through a one-way drive 31 and is urged towards the closed end of the counterbore 22 by a compression spring 19 housed in the counterbore 21.

When the brake is to be applied, operation of the actuator causes the wedge 10 to move transversely with respect to the bore 2, in turn to cause the strut assembly 1 to move axially to apply the brake as described above. When the brake clearances are satisfactory the rack 27 does not engage with pinion 23 so the adjuster mechanism 5 is unaffected. However, when adjustment is required, this is determined by the wedge 10 having travelled a distance sufficient in the application of the brake, for the rack teeth to mesh with the pinion 23 and rotate the pinion 23 until the brake is fully applied. The spindle 20 rotates through an equivalent angular distance by operation of the one-way drive 24, and the second pinion 25 is screwed back along the screw-thread 26 away from the face 30 against the force in the spring 28 in which energy is stored. During this movement the teeth on the pinion 25 slide axially over the teeth 18 on the sleeve 7, in turn holding the pinion 25 against rotation. Upon release of the brake the wedge 10 is withdrawn from the pinion 23, which rotates freely on the spindle 20 by operation of the one-way drive 24. The spindle is held against rotation by the one-way drive 31, and the release of energy in the spring 28 is operative to move the pinion 25 bodily and axially to return it to its initial position in engagement with the face 30. During this movement the pinion 25 simultaneously rotates with respect to the spindle 20, in turn causing the sleeve 7 to rotate relative to the thrust member 8, which is held against rotation by its engagement with the brake part and by the re-set member 33 in a manner to be described. This substantially increases the effective length of the strut assembly 1 to compensate for wear of the friction linings and maintain the brake clearances within desired limits.

In order to re-set the strut assembly 1 to permit replacement of brake linings the re-set member 33 is accessible from the end of the housing 3 remote from the thrust plate 9. The re-set member 33 comprises a spindle 34 which is journalled for rotation in the housing 3 and has a splined or other slidably keyed engagement in an axial bore 35 in the thrust member 8 and, at its outer end, carries a head 36 in the peripheral edge of which is provided a series of angularly spaced recesses 37, in any one of which a spring loaded peg 38 can be received to hold the thrust member 8 against rotation in any desired position, relative to the plate 9. Rotation of the head 36 screws the thrust member 8 relative to the sleeve 7 in order to alter the effective length of the thrust assembly 1 with the sleeve 7 being held against rotation by its engagement with the pinion 25 and the effect of the one-way drive 31.

The actuator assembly illustrated in FIGS. 5 to 8 of the drawings comprises a housing 40 having a longitudinally extending open-ended bore 41 which is traversed by a transfer chamber 42 in which is housed a wedge-expander assembly 43. A pair of oppositely-acting strut assemblies 44, 45 work in the bore 41 and their inner ends are adapted to be separated to urge them outwardly to apply the brake by movement of the wedge assembly 43 in a transverse direction. This is achieved by operation of an actuator 46 and against the force in a return spring 47.

Each strut assembly 44, 45 comprises a rotatable internally screw-threaded outer sleeve 48 which is guided to slide in the bore 41, and a non-rotatable externally screw-threaded inner tappet 49 which is held against rotation by the engagement with caliper brake levers (not shown).

The wedge assembly 43 comprises a wedge 50 which acts on inclined faces of members 39, in turn acting on the inner ends of the sleeves 48 through caged rollers 51 in order to separate the adjacent ends simultaneously. The sleeves 48 are rotable relative to the members 39 with the inclined faces. The rollers 51 are received in slots in the ends of the members, in order to hold the members against rotation.

An adjuster mechanism 52 is mounted in parallel with the bore 41 in a chamber defined within an end-cap 53 detachably secured to the housing 40. The adjuster mechanism 52 comprises a longitudinally extending spindle 54 which is mounted against rotation. A pair of externally screw-threaded members 55 and 56 are mounted for rotation on spaced portions of the spindle 54 through one-way drives 57 and 58 respectively, and the drives 57 and 58 are so arranged that each member 55 and 56 is rotatable with respect to the spindle 54 in one direction only. Respective pinions 59, 60 are screw-threadably mounted on the respective members 55, 56. Each pinion 59, 60 has a linear tooth formation meshing with a similar linear tooth formation 61, 62 on a respective one of the sleeves 48, and is normally urged inwardly by a compression spring 63, 64 which acts on it through a bearing 65. The pinions 59, 60 have oppositely arranged adjacent thrust faces 66, 67 upon each of which acts the outer ends of a lever 68 of generally H outline of which the inner end is pivotally connected to the housing 40 by a transverse pivot pin 69, and at an intermediate point in the length of its limbs carries oppositely directed pins 70 which are received in diametrically opposed elongate slots 71 in the sleeve 48. The clearance between the pin 70 and the end of the respective slot 71 determine the braking clearance for the respective braking member on that side of the brake.

When the brake is applied, operation of the actuator 46 causes the wedge 50 to move transversely, in turn to cause the strut assemblies 44, 45 to separate and apply the brake as described above. When the braking clearances are satisfactory, the pins 70 do not engage with the ends of the slot 71, so the adjuster mechanism 52 is unaffected. However, when adjustment is required, this is determined by a strut assembly travelling in the brake-applying direction a distance sufficient for the pins 70 to be engaged by the wall of the respective slot 71. For example, should the clearances of the braking member operated by the strut assembly 45 require adjustment, then the lever 68 will be moved angularly to engage with the thrust face 67 on the pinion 60, in turn to move the pinion 60 axially, with the teeth sliding axially with respect to the teeth on the sleeve 48. Resulting from the direction of the drive 58, the member 56 is rotated on the spindle 54 with the spring 64 being compressed to store energy in it.

Upon release of the brake, the lever 68 is moved angularly in the opposite direction and the energy is released from the spring 64 to urge the pinion 60 axially in the opposite direction. However, since the member 56 is locked to the spindle 54 against relative rotation in that direction, the pinion 60 is rotated as it moves axially. This, in turn, causes the sleeve 48 to be rotated relative to the tappet 49 to increase the effective length of the strut assembly 45 and maintain the braking clearances within the desired limits.

In the construction described above with reference to FIGS. 5 to 8 the effective lengths of the two strut assemblies 44, 45 are adjustable independently of each other in accordance with the required braking clearances of the respective braking members.

Figure 1:
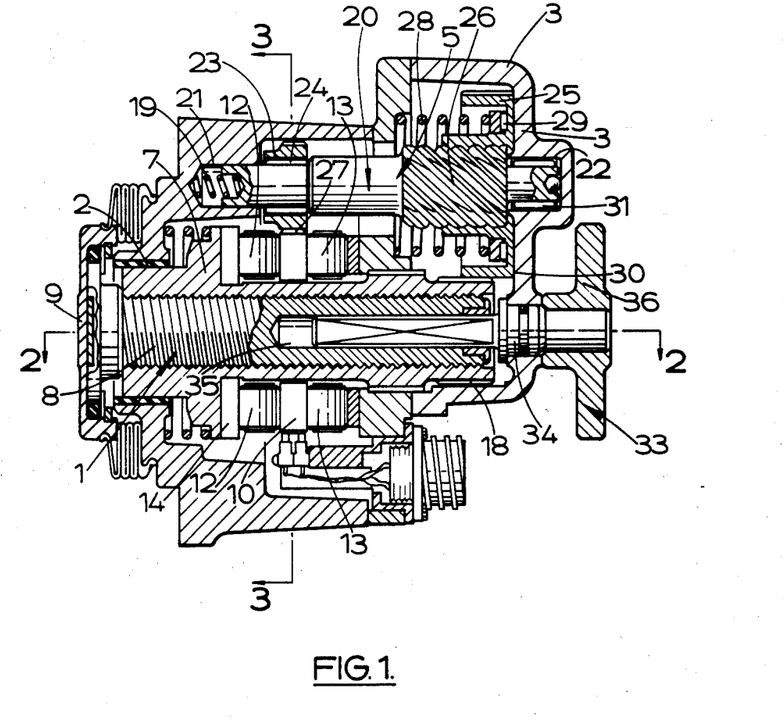
FIG. 1 is a longitudinal section through an actuator for a brake for a rail vehicle.
Figure 2:
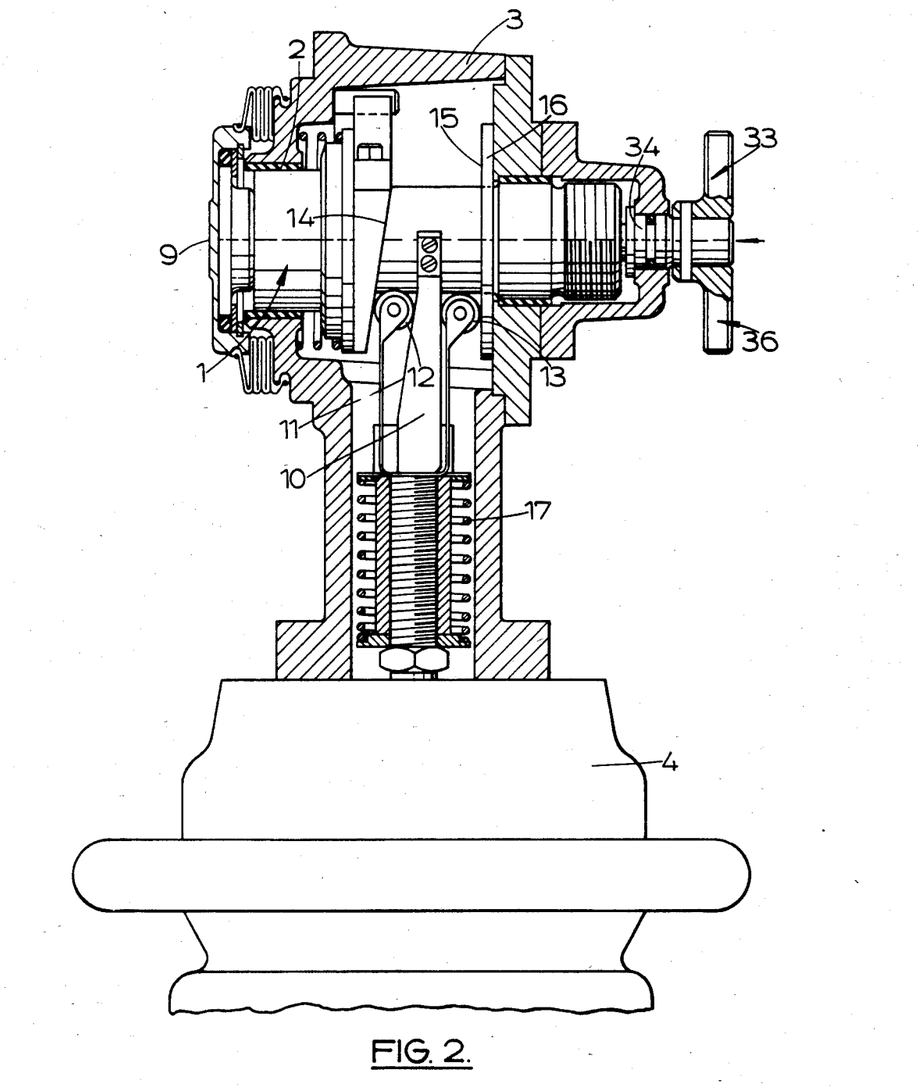
FIG. 2 is a section on the line 2—2 of FIG. 1.
Figure 3:
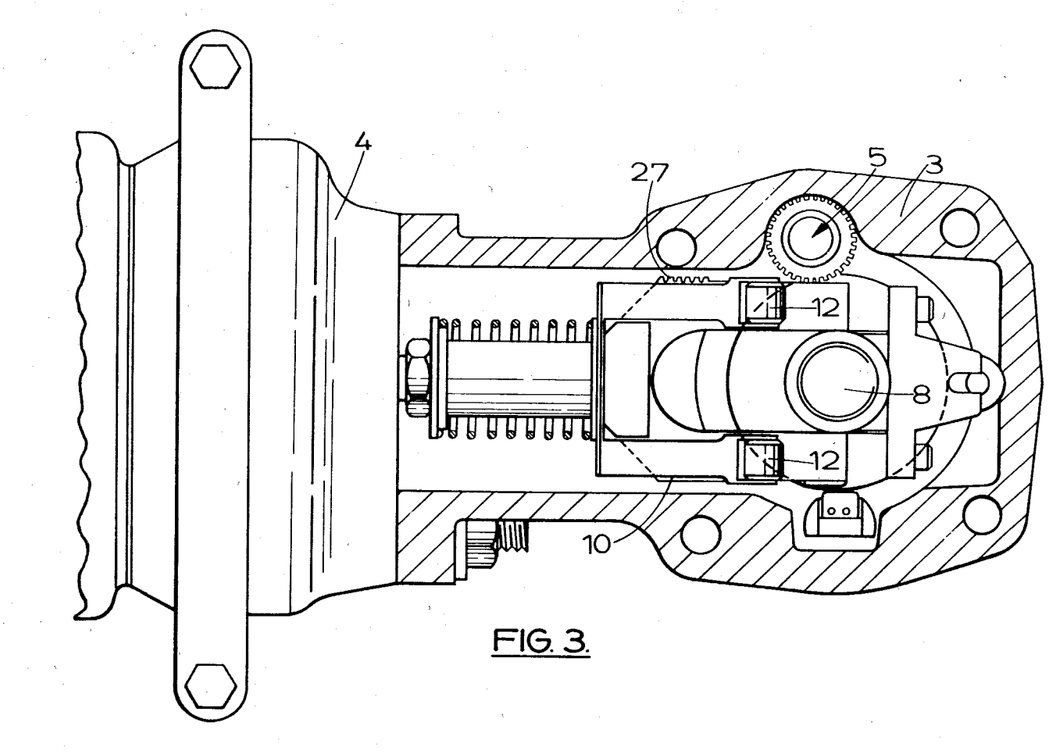
FIG. 3 is a section on the line 3—3 of FIG. 1.
Figure 4:
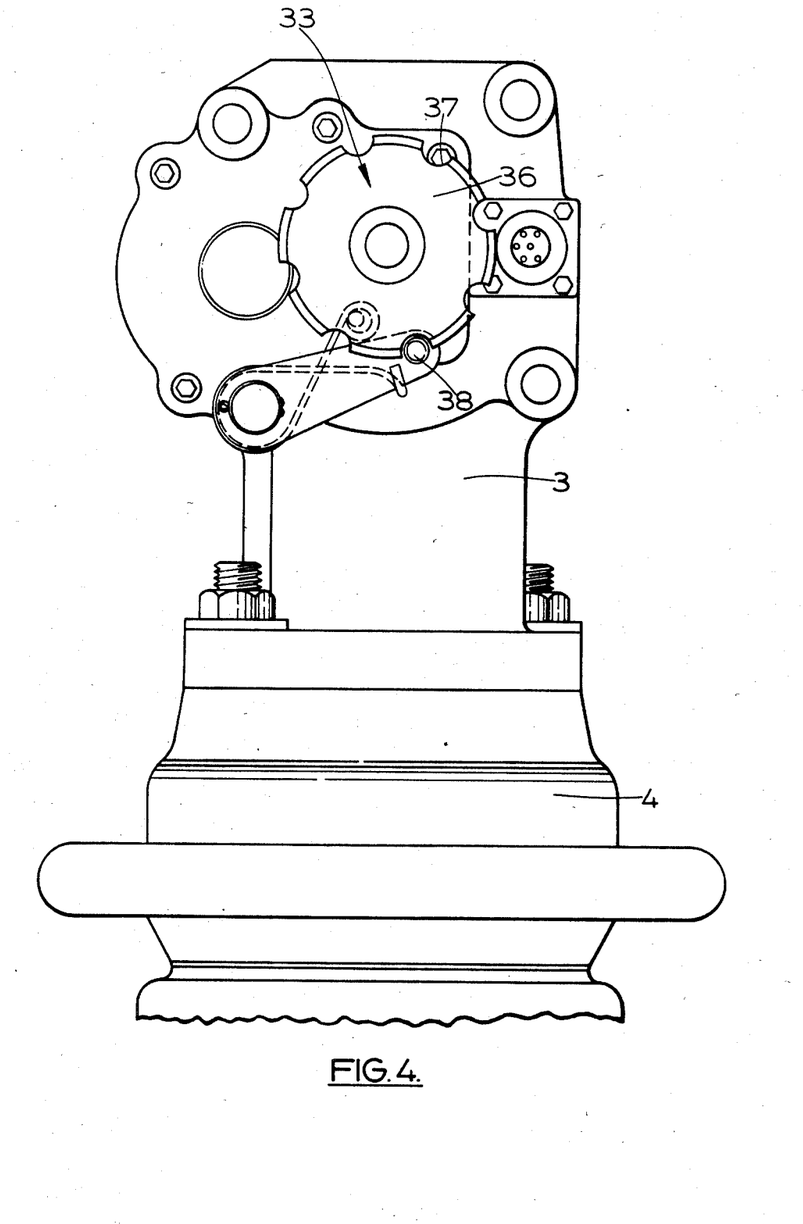
FIG. 4 is a view in the direction of the arrow in FIG. 2.
Figure 5:
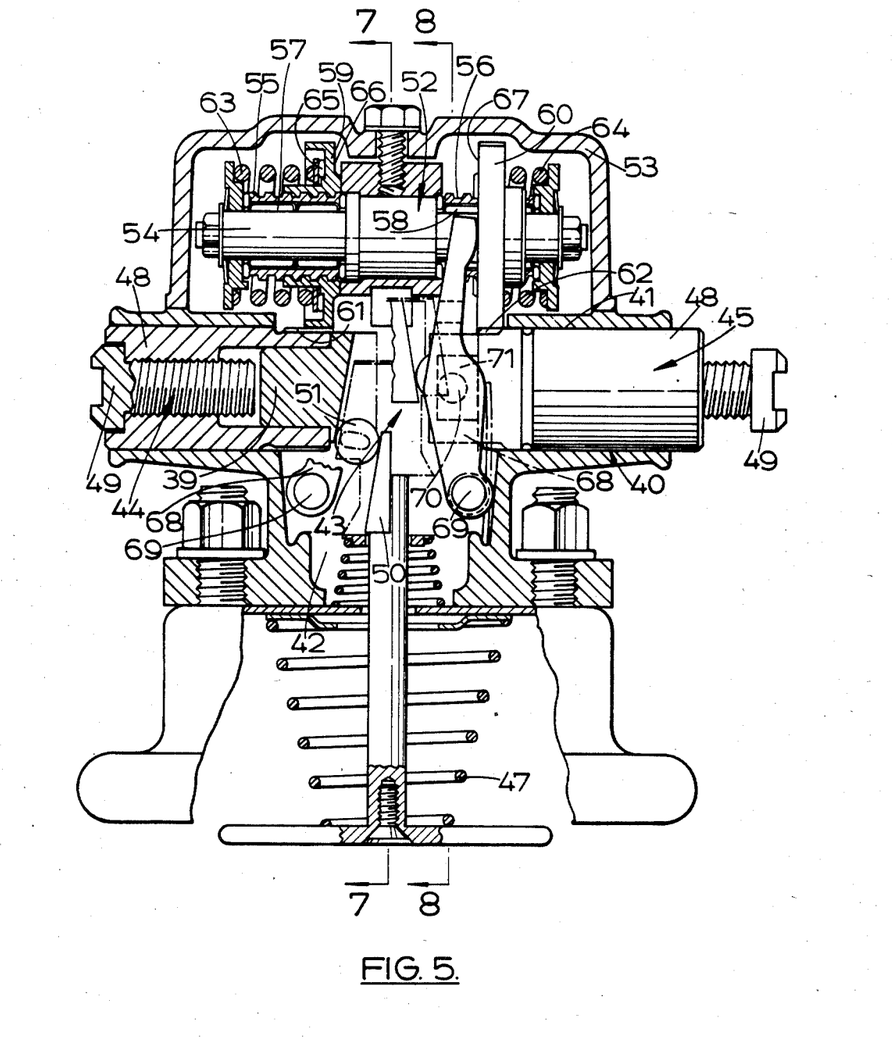
FIG. 5 is a longitudinal section through another actuator for a brake for a rail vehicle and taken on the line 5—5 of FIG. 6.
Figure 6:
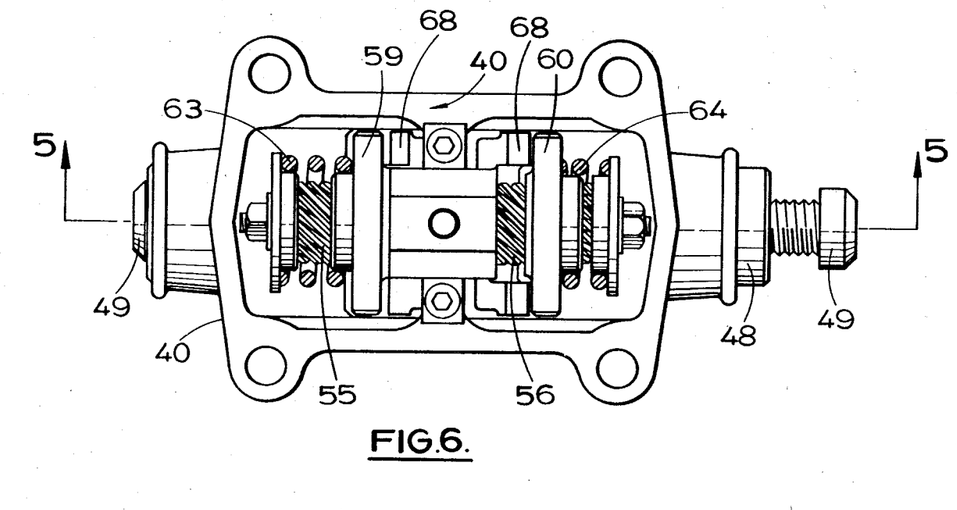
FIG. 6 is a top view of the actuator of FIG. 5, with an end-cap removed for clarity.
Figure 7:
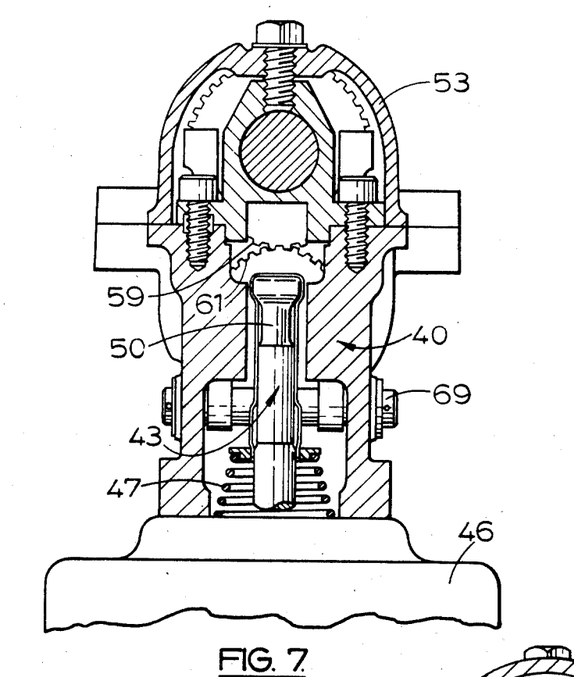
FIG. 7 is a section on the line 7—7 of FIG. 5.
Figure 8:
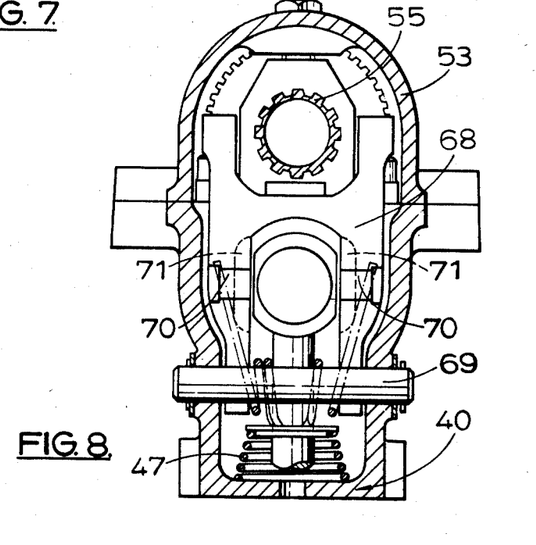
FIG. 8 is a section on line 8—8 of FIG. 5.
Figure 9:
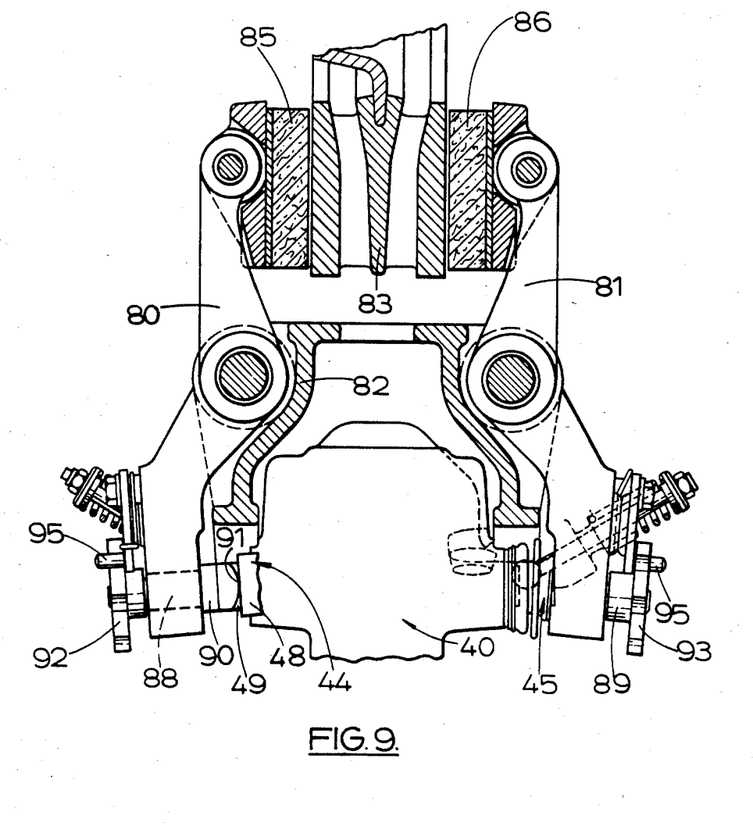
FIG. 9 is side elevation of the actuator installed in a brake for a rail vehicle including a section on the line 9—9 of FIG. 10.
Figure 10:
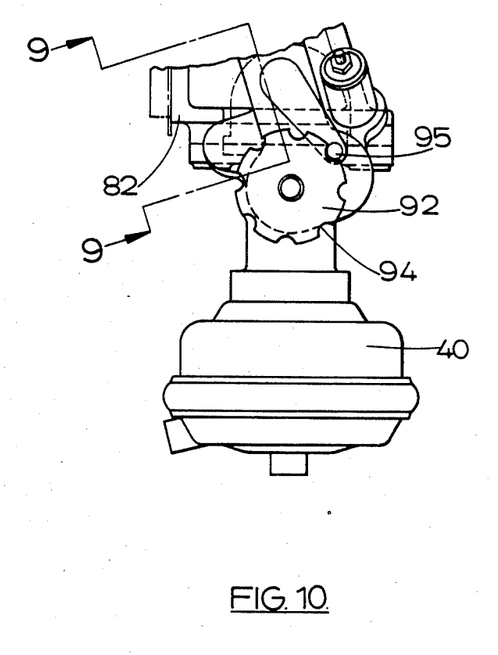
FIG. 10 is a plan of the actuator illustrated in FIG. 9.

The actuator assembly of FIGS. 5 to 8 is adapted to actuate a disc brake for a rail vehicle. As illustrated in FIGS. 9 and 10 the brake comprises a pair of caliper levers 80, 81 which are pivotally mounted at intermediate points in their lengths on a stationary member 82. At their inner ends the levers 80, 81 straddle the peripheral edge of a rotatable disc 83 to be braked. The levers 80, 81 at their inner ends carry friction pad assemblies 85, 86 for engagement with opposite faces of the disc 83 and, in a conventional manner, the drag on the pad assemblies 85, 86, when the brake is applied, is taken by the stationary member 82.

The actuator assembly 40 is mounted on the stationary member 82 between the outer ends of the levers 80, 81 so that operation of the actuator assembly separates the levers 80, 81 at their outer ends, in turn to urge the inner ends towards each other to apply the pad assemblies 85, 86 to the disc 83.

As illustrated the tappets 49 act on the levers 80, 81 through respective adjuster spindles 88, 89 which are journalled for rotation in bores which extend through the levers 80, 81. Each spindle 88, 89 is of stepped outline having an integral head 90 of increased diameter at its inner end. The head 90 bears against the inner face of the respective lever and is provided with tongue 91 which is received within a slot in the head of the tappet 49, and is of arcuate outline to define a rolling engagement with the base of the slot in the tappet. The outer ends of the spindles 88, 89 project from the levers 80, 81 and carry heads 92, 93. Each head 92, 93 is fast with its spindle. The peripheral edges of the heads 92 and 93 are provided with angularly spaced recesses 94, in any one of which a spring-loaded peg 95 can be received to hold the respective spindle 88, 89 against rotation relative to the respective lever 80, 81.

When the brake is initially assembled, the pegs 95 are released from the recesses 94 against their spring-loadings, and the heads 92 and 93 are rotated independently of each other to adjust the effective lengths of the strut assemblies 44 and 45 in order to set the brake clearances at desired values. The pegs 95 are then engaged with the heads 92 and 93 to hold the spindles 88, 89, and in consequence the tappets 49, against rotation.

As the pad assemblies 85 and 86 wear in service the adjuster mechanism 52 is operative, as described above, to maintain the loading clearances at predetermined levels.

When it becomes necessary to replace the pad assemblies 85 and 86, before or after removal of worn assemblies the pegs 95 are first released, and the heads 92, 93 are then rotated to reduce the effective lengths of the strut assemblies 44, 45 thereby increasing the spacing between the inner ends of the levers 80 and 81 by an amount sufficient to receive the new pad assemblies. After the new assemblies have been fitted, the heads 92 and 93 can then be rotated in the opposite direction to set the braking clearances as described above.

I claim:

1. An actuator assembly for a vehicle brake comprising a braking member having a friction lining, brake-applying means for applying a brake-applying force to said braking member, a strut assembly through which said brake-applying force is transmitted from said brake-applying means to said braking member and of which the effective length is adjustable, a housing having a longitudinal bore in which said strut assembly is guided for axial sliding movement, and adjuster means for increasing said effective length of said strut assembly to compensate for wear of said friction lining and maintain braking clearances within predetermined limits, said adjuster means incorporating relatively rotatable parts, a spring in which energy is stored in response to relative rotation between said parts when said actuator assembly is operated to apply the brake and after a degree of lost-motion consistent with said braking clearances has been taken up, and means for transmitting energy released from said spring to said strut assembly upon release of the brake in order to adjust said effective length of said strut assembly, wherein said adjuster means is arranged in parallel with said strut assembly and incorporates said spring in which energy is adapted to be stored, said adjuster means being adapted to receive a signal dependent upon movement of said brake-applying means in a brake-applying direction, and said adjuster means being adapted to apply an adjusting force to said strut assembly in response to energy released from said spring when said brake is released.

2. An actuator assembly as claimed in claim 1, wherein said signal is applied to said adjuster means through a connection which includes a degree of lost-motion.

3. An actuator assembly as claimed in claim 2, wherein a pinion is coupled to said adjuster means, and a toothed rack movable with said brake-applying means is adapted to mesh with said pinion, said degree of lost-motion comprising back-lash between said teeth of said rack and said pinion which is taken up to initiate operation of said adjuster means when adjustment is required.

4. An actuator assembly as claimed in claim 2, wherein said lost-motion is provided by a pin and slot connection between said strut assembly and an intermediate point in the length of a lever having first and second ends, of which one of said ends is pivotally connected to a fixed pivot in said housing and the other of said ends acts on said adjuster means.

5. An actuator assembly as claimed in claim 1, wherein said strut assembly comprises inner and outer screw-threaded members, and said outer member meshes with a pinion incorporated in said adjuster means and which is rotatable, when adjustment is required, in order to rotate said outer member relative to said inner member, whereby to increase said effective length of said strut assembly.

6. An actuator assembly as claimed in claim 5, wherein said teeth on said pinion are arranged linearly so that said outer member can move axially without imparting rotation to said pinion, and said pinion, in turn, is screw-threadably mounted on a spindle, a one-way drive being provided for locking said spindle against rotation in one direction with respect to said housing, and said spring urging said pinion in a direction opposite to that in which said pinion is moved axially in response to rotation of said spindle after said lost-motion has been taken up, release of stored energy in said spring being operable to rotate said pinion with respect to said spindle, in turn rotating said outer member with respect to said inner member in order to adjust said effective length of said strut assembly.

7. A vehicle brake comprising relatively non-rotatable and rotatable braking members, brake-applying means for applying a brake applying force to said braking members, a strut assembly through which said braking applying force is transmitted from said brake-applying means to said braking members and of which the effective length is adjustable, an abutment on said strut assembly upon which said brake-applying means acts, a outer end of said strut assembly co-operating with said relatively fixed braking member to urge said braking member in a general axial direction into braking co-operation with said rotatable braking member, a housing having a longitudinal bore in which said strut assembly is guided for axial sliding movement, and adjuster means for increasing said effective length of said strut assembly to compensate for wear of said friction lining and maintain braking clearances within predetermined limits, said adjuster means incorporating relatively rotatable parts, a spring in which energy is stored in response to relative rotation between said parts when said brake is applied and after a degree of lost-motion consistent with said braking clearances has been taken up, and means for transmitting energy released from said spring to said strut assembly upon release of the brake in order to adjust said effective length of said strut assembly, wherein said adjuster means is arranged in parallel with said strut assembly and incorporates said spring in which energy is adapted to be stored, said adjuster means being adapted to receive a signal dependent upon movement of said brake-applying means in a brake-applying direction, and said adjuster means being adapted to apply an adjusting force to said strut assembly in response to energy released from said spring when said brake is released.

8. A vehicle brake as claimed in claim 7, wherein a pair of relatively non-rotatable braking members are engageable with opposite faces of said rotatable braking member, and said brake-applying means acts between abutments on a pair of strut assemblies of which adjacent ends are adapted to move away from each other to apply said relatively non-rotatable braking members to said rotatable braking member in response to operation of said brake-applying means, an adjuster means being provided for each strut assembly whereby the effective length of each said strut assembly is adjustable independently of the other in accordance with required braking clearances of said respective relatively fixed braking members.

9. A vehicle brake as claimed in claim 7, including a lever through which said strut assembly acts on said relatively non-rotatable braking member, and said lever is pivotally mounted at an intermediate point in its length on a stationary member and of which opposite ends co-operate with said outer end of said strut assembly and said braking member, said strut assembly acting on said lever through an adjuster spindle rotatably mounted in the adjacent end of said lever, and means coupling said spindle to said strut assembly whereby the effective length of said strut assembly can be adjusted manually by rotation of the spindle.

10. A vehicle brake as claimed in claim 9, wherein a head integral with said adjuster spindle is provided in its peripheral edge with a plurality of angularly spaced notches, and a spring-loaded peg is releasably engageable in one of said notches to hold said spindle against rotation.

* * * * *